No. 863,620.
PATENTED AUG. 20, 1907.
C. H. MARTENS.
FLOWER SUPPORT.
APPLICATION FILED OCT. 29, 1906.
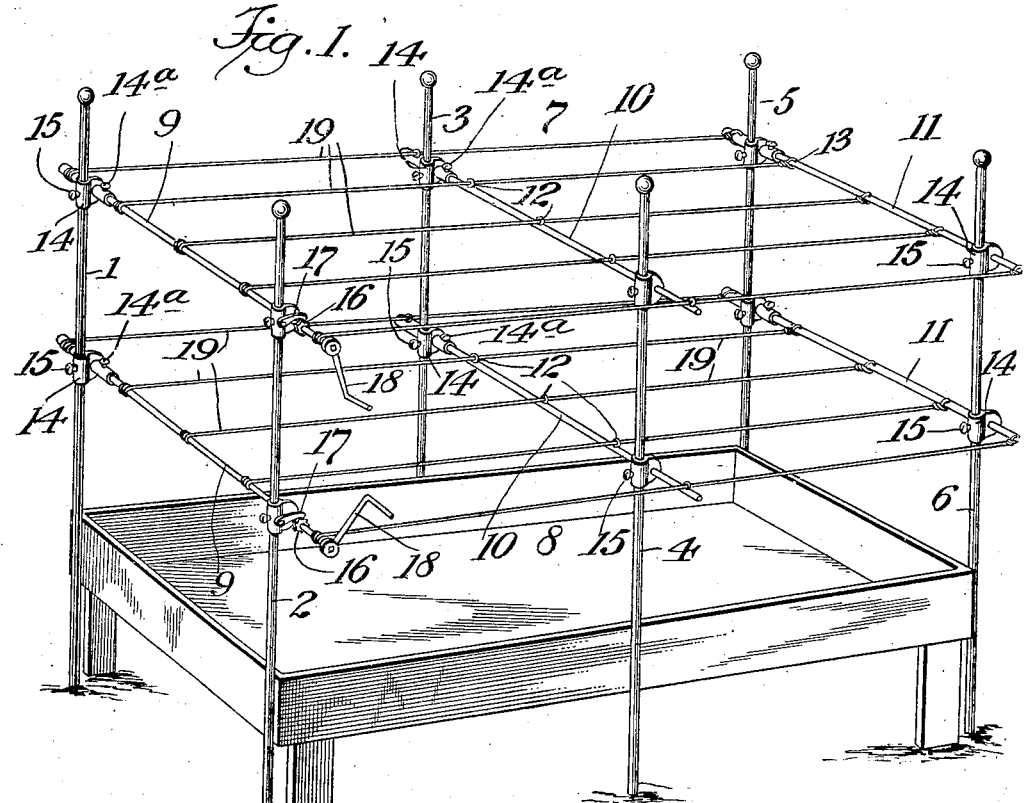
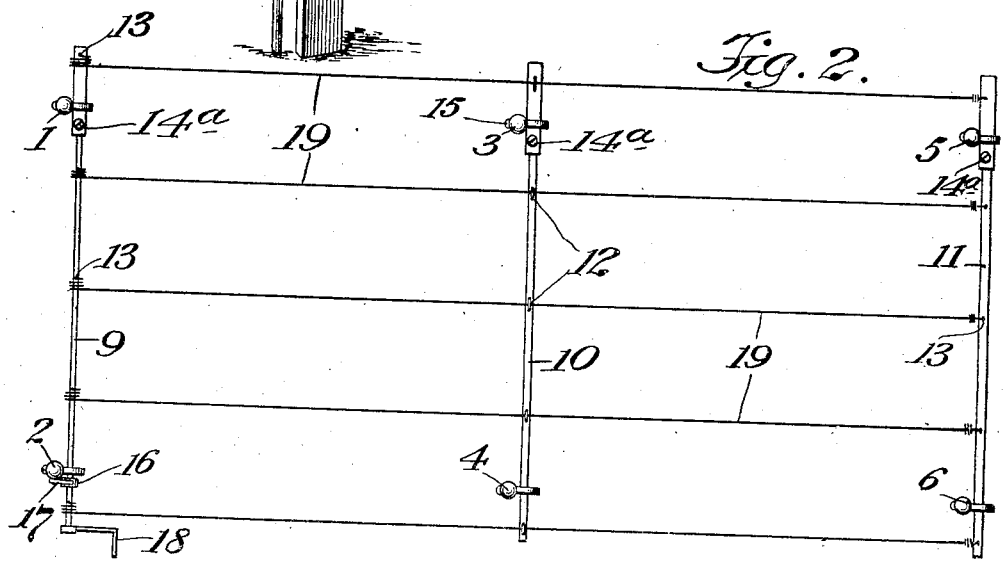

UNITED STATES PATENT OFFICE.

CHARLES H. MARTENS, OF BROOKLYN, NEW YORK.

FLOWER-SUPPORT.

No. 863,620.

Specification of Letters Patent.

Patented Aug. 20, 1907.

Application filed October 29, 1906. Serial No. 340,972.

*To all whom it may concern:*

Be it known that I, CHARLES H. MARTENS, a citizen of the United States, and a resident of Brooklyn, in the county of Kings and State of New York, have invented certain new and useful Improvements in Flower-Supports, of which the following is a specification.

My invention relates to flower supports.

It is absolutely necessary in growing long stemmed flowers, such for instance as pinks, that some means be provided for supporting them in an upright position, as otherwise they will fall down and decay causing a loss to the florist, consequently various devices have been employed for this purpose, but all of which were more or less crude and unsatisfactory, the most common of these devices being a wooden frame the top of which was slatted, but the wood soon rotted and there was no means whereby the slats and frame could be adjusted to accommodate the height of the flowers and the width of the box around which the frame was built and it could only be used for one sized box.

My invention therefore has for its object to provide a simple, durable and effective flower support constructed of metal or other suitable material adapted to accommodate the size of box around and over which it is to be placed and provided with vertically adjustable and laterally extensible superposed supports each having parallelly arranged wires and means for extending and shortening said wires and holding them taut.

In the drawings:—Figure 1 is a perspective view showing my flower support arranged around and above a box of the character usually employed for growing pinks. Fig. 2 a plan view.

Like reference characters designate corresponding parts in all the figures of the drawings illustrating my invention.

Referring to the drawings, 1, 2, 3, 4, 5 and 6 designate metallic posts preferably of pipe, the lower ends being pointed and the upper ends provided with heads and said posts being driven into the ground in contact with or adjacent the sides and ends of the box. Upon these posts are mounted vertically adjustable laterally extensible superposed supports 7 and 8 each embodying two-part laterally extensible shafts 9, 10 and 11, the shafts 9 and 11 having holes 13 therein, the shaft 10 having eyes 12 secured thereon, and all of said shafts having set-screws 14ª for securing the parts in extended position and sleeves 14 which receive the ends of said shafts and are adjustably secured on the posts by set-screws 15.

The shafts 10 and 11 are secured in their sleeves while the shaft 9 is rotatably mounted in its sleeves and held in the desired position by means of a ratchet wheel 16 secured thereon adjacent one end and engaged by a pawl 17 pivoted on a sleeve of the superposed support. To provide means for revolving the shaft 9 the end is squared to receive a crank 18.

The wires or members 19, for supporting the flowers and between which the stems project, extend through the eyes 12 on the shaft 10 and one end of each is passed through a hole 13 in the shaft 11 and twisted upon itself and the other end passed through a hole 13 in the shaft 9 and twisted upon itself, the wires being longer than the distance between the end shafts 9 and 11 and wound upon the shaft 9 which serves as a reel, whereby when it is desired to increase the distance between said shafts the shaft 9 is turned to unwind the wire therefrom and when desired to decrease the distance between said shafts the shaft 9 is turned to wind the wire thereon.

The operation is as follows:—To place the support in position to support flowers, say pinks, in an upright position in a box, the pawls are raised from engagement with the ratchet wheels and the shafts turned by means of the cranks to unwind the wires therefrom until the proper distance is obtained between said shafts and the pawls lowered into engagement with the ratchet wheels again, the set-screws of the shafts are loosened and the parts of said shafts on one side pulled out of those on the other side until the proper distance is obtained between the posts on each side and the set screws again tightened, the posts are then driven into the ground at the ends and sides of the box, the posts 1 and 2 being located at one end, the posts 5 and 6 at the other end and the posts 3 and 4 on opposite sides of the box, the set-screws of the sleeves are then loosened and the sleeves slid up or down on the posts to bring the superposed supports to the proper position and the set screws again tightened and finally the shafts are again turned by the cranks thereon to wind the wires thereon and hold them taut.

Having now described my invention what I claim as new and desire to secure by Letters Patent, is

1. In a flower support, posts and supports on said posts comprising non-rotatable and rotatable shafts and spaced members one end of each member of each support being secured to a non-rotatable shaft and the other end to the rotatable shaft, substantially as described.

2. In a flower support, posts and supports on said posts comprising non-rotatable and rotatable shafts each made in sections and spaced members one end of each member of each support being secured to a non-rotatable shaft and the other end to the rotatable shaft, substantially as described.

3. In a flower support, posts and supports vertically adjustable on said posts and comprising non-rotatable and rotatable shafts and spaced members one end of each member of each support being secured to a non-rotatable shaft and the other end to the rotatable shaft, substantially as described.

4. In a flower support, posts and supports vertically adjustable on said posts and comprising non-rotatable and rotatable shafts each made in sections and spaced members one end of each member of each support being secured to a non-rotatable shaft and the other end to the rotatable shaft, substantially as described.

Signed at New York, in the county of New York, and State of New York, this 27th day of October, A. D. 1906.

CHARLES H. MARTENS.

Witnesses:
A. R. APPLEMAN,
A. B. BLACKWOOD.